United States Patent
Rikkert

(10) Patent No.: US 7,891,730 B2
(45) Date of Patent: Feb. 22, 2011

(54) DRIVE UNIT FOR AT LEAST TWO MOVABLE PARTS OF A VEHICLE, IN PARTICULAR A ROOF ASSEMBLY THEREOF

(75) Inventor: Robert Rikkert, Nuenen (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 12/395,827

(22) Filed: Mar. 2, 2009

(65) Prior Publication Data

US 2009/0224574 A1    Sep. 10, 2009

(30) Foreign Application Priority Data

Mar. 4, 2008    (EP)    ................... 08102275

(51) Int. Cl.
    *B60J 7/057*    (2006.01)
(52) U.S. Cl. .................. 296/223; 296/220.01; 475/151
(58) Field of Classification Search .................. 296/223, 296/220.01, 214; 475/151
    See application file for complete search history.

(56) References Cited

U.S. PATENT DOCUMENTS

| 4,659,140 A | * | 4/1987 | Fuerst et al. | ................. 296/223 |
| 5,768,942 A | | 6/1998 | Gruber et al. | |

| 2004/0119433 A1 | 6/2004 | Tanoi |

FOREIGN PATENT DOCUMENTS

| DE | 4318481 | * | 12/1994 |
| DE | 4323946 | | 12/1994 |
| DE | 19952168 | * | 5/2001 |
| DE | 10349116 | | 5/2004 |
| EP | 1588882 | | 10/2005 |

OTHER PUBLICATIONS

Official Search Report of the European Patent Office in counterpart foreign application No. 08102275.8 filed Mar. 4, 2008.

* cited by examiner

*Primary Examiner*—Dennis H Pedder
(74) *Attorney, Agent, or Firm*—Steven M. Koehler; Westman, Champlin & Kelly, P.A.

(57) ABSTRACT

A drive unit for at least two movable parts of a vehicle, in particular closures for selectively opening and closing at least one roof opening in a roof assembly, includes an electric motor having a rotor shaft and transmission assembly. The transmission assembly includes at least two output shafts and a switch mechanism including a locking member in order to selectively allow one output shaft to be driven by the electric motor and to lock the other output shaft. The transmission assembly includes a first transmission included in a housing of the electric motor and acting between the rotor shaft and a drive shaft. A second transmission is housed in a gearbox separate from the housing of the electric motor and mounted thereto with the drive shaft in engagement with the second transmission.

16 Claims, 6 Drawing Sheets

DRIVE UNIT FOR AT LEAST TWO MOVABLE PARTS OF A VEHICLE, IN PARTICULAR A ROOF ASSEMBLY THEREOF

BACKGROUND

The discussion below is merely provided for general background information and is not intended to be used as an aid in determining the scope of the claimed subject matter.

There is a trend in the automotive industry to use more and more electric drives for movable parts of the vehicles. In the case of roof assemblies for vehicles this trend is also visible, i.e. by the use of multi-panel roofs having multiple panels, sun shades and/or rollo's which are all electrically driven.

A drive unit which can be used for driving different parts of a vehicle is known from EP 1 588 882. This prior art document discloses a drive unit including an electric motor which is in engagement with a planetary gear mechanism having two or more output shafts to drive different parts through the same electric motor. Such drive units are expensive and the electric motors must be designed especially for this particular situation.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A drive unit for at least two movable parts of a vehicle, in particular closures for selectively opening and closing at least one roof opening in a roof assembly, includes an electric motor having a rotor shaft and transmission assembly. The transmission assembly includes at least two output shafts and a switch mechanism including a locking member in order to selectively allow one output shaft to be driven by the electric motor and to lock the other output shaft. The transmission assembly includes a first transmission included in a housing of the electric motor and acting between the rotor shaft and a drive shaft. A second transmission is housed in a gearbox separate from the housing of the electric motor and mounted thereto with the drive shaft in engagement with the second transmission.

Due to these features, the electric motor and its first transmission may be developed separately from the second transmission, so that the electric motor can be standardised and used for different purposes, while the second transmission can be adapted to the particular use and then added to the electric motor.

The electric motor and the first transmission can even be designed such that it can be used with and without second transmission. The electric motor and its first transmission can thus be a standard electric motor which is built in large numbers, and the invention makes it possible to use such standard electric motor for this multiple drive use by means of an add-on second transmission, thereby reducing production costs considerably.

The invention is particularly suitable for driving movable parts by means of push-pull cables.

The second transmission is preferably a gear mechanism, more particularly a planetary gear mechanism. Such planetary gear is favorable to obtain a small building height.

The invention also includes a transmission assembly for use with an electric drive motor of the drive unit having a drive shaft. The transmission assembly includes two output shaft and one input and is accommodated in a gearbox which is attachable to a housing of the electric motor with the input of the transmission assembly connected to the drive shaft of the electric motor.

The invention also includes a roof assembly for a vehicle, comprising a plurality of movable parts and at least a drive unit as described above.

BRIEF DESCRIPTION OF THE DRAWINGS

The invention will hereafter be further elucidated with reference to the drawings showing an embodiment of the invention by way of example.

DETAILED DESCRIPTION OF THE ILLUSTRATIVE EMBODIMENT

Figure 1:
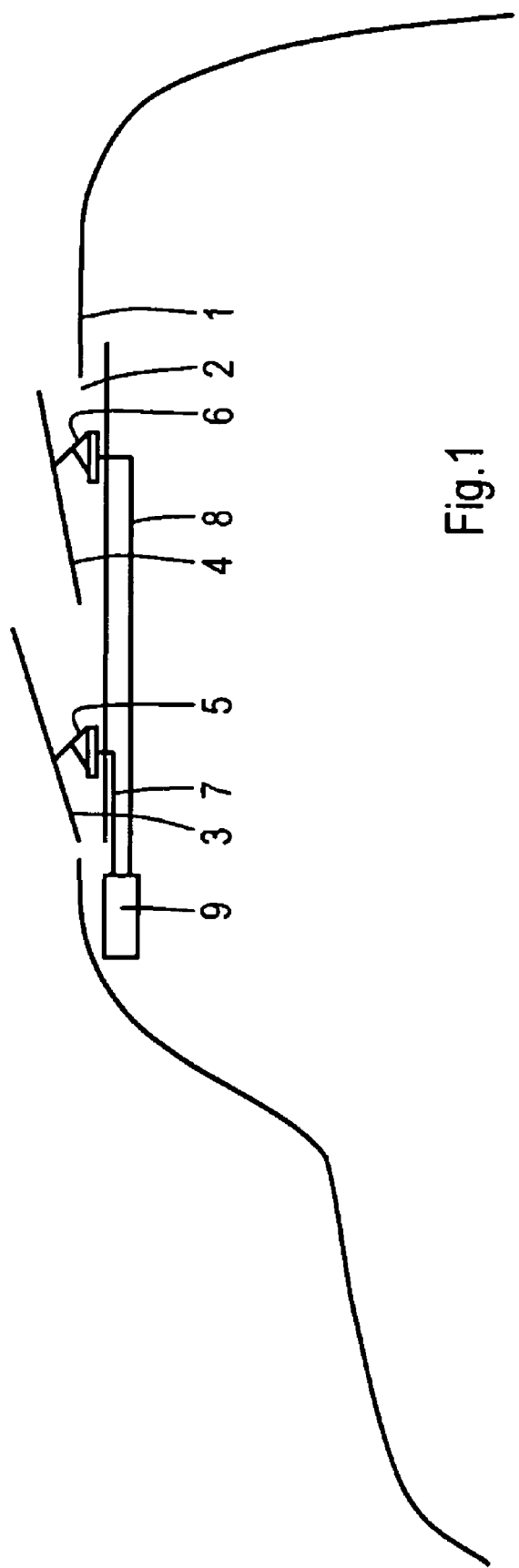
FIG. 1 is a very schematic longitudinal sectional view of a vehicle roof comprising a roof assembly having a plurality of movable parts which are driven by an embodiment of the drive unit according to the invention.

FIG. 1 shows in a very schematic way a part of a vehicle, in particular a passenger car, including a fixed roof 1 and having incorporated therein a roof assembly for selectively opening and closing one or more openings 2 in the fixed roof 1. In the embodiment shown, the roof assembly includes two closures, here closing panels 3 and 4 which are each movable by means of an operating mechanism 5, 6 respectively. Generally, there will be an operating mechanism on each side of the roof opening 2. The operating mechanisms 5, 6 are driven by their own drive cable or push-pull cable 7, 8 which are driven by a common drive unit 9. This drive unit is adapted to selectively actuate the operating mechanisms 5, 6 of the closure panels 3, 4 through the cables 7, 8. It should be noted however, that it is conceivable that the drive unit 9 drives even more movable parts, or drives other parts of the vehicle, in particular of the roof assembly, such as other types of closure elements, sun shades, rollo's, wind deflectors and the like. Also other means instead of cables could be used to connect the drive unit 9 and the operating mechanisms 5, 6. The operating mechanisms generally run in guide rails, which extend in longitudinal direction of the vehicle, in the embodiment shown. The guide rails may form part of or may be mounted to a frame, to which the drive unit 9 may also be mounted. Such structure of a roof assembly is known in the art.

FIGS. 2-6 show an embodiment of the drive unit having aspects of the invention.

Figure 2:
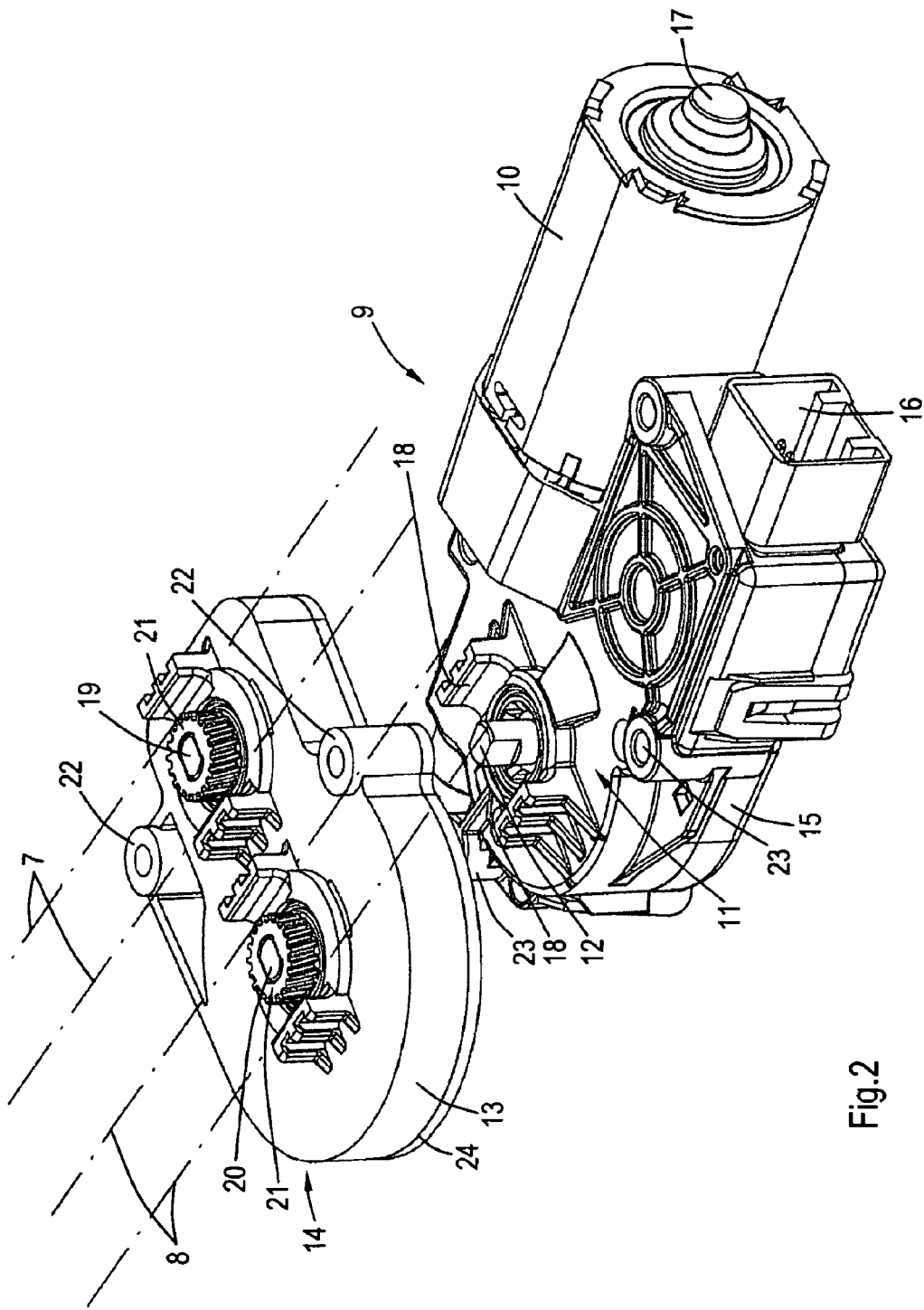
FIG. 2 is a perspective view of the drive unit according to the invention with the electric motor and the gear box of the second transmission shown in detached condition.
Figure 3:
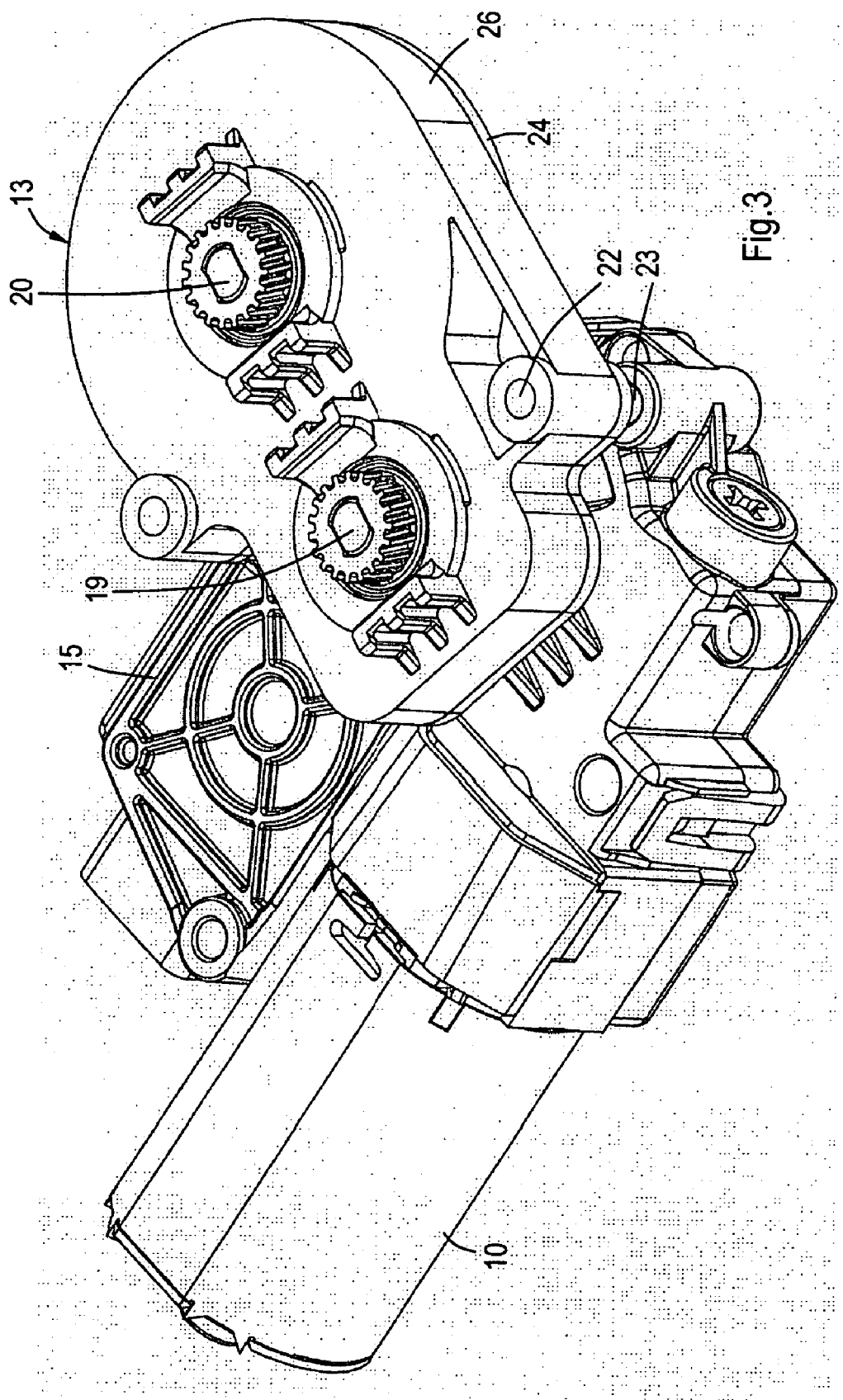
FIG. 3 shows the drive unit of FIG. 2 from the other side, also in perspective view, but with the gear box of the second transmission close to its mounting position.
Figure 4:
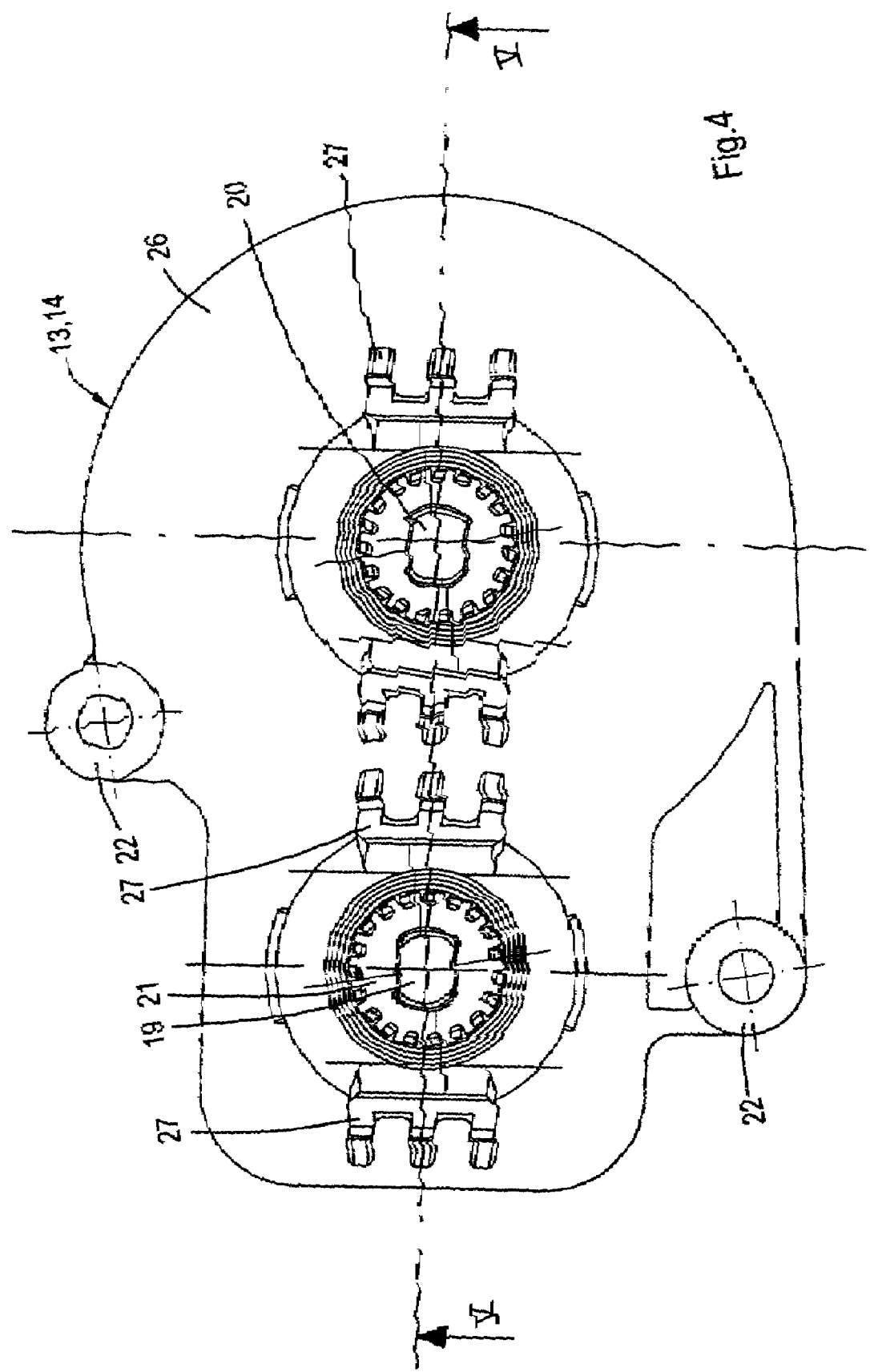
FIG. 4 is a plan view of the gear box of the second transmission of FIGS. 2 and 3.

FIGS. 2 and 3 show that the drive unit 9 includes two main assemblies, that is the electric motor 10 incorporating a first transmission 11 having a drive shaft 12, and a second assembly a gear box 13 having a second transmission 14 adapted to be connected to the drive shaft 12 of the first transmission 11.

The electric motor 10 may be a standard component and may include a housing 15, an electric connection 16, a rotor shaft 17 and the first transmission 11. This first transmission 11 generally includes a worm mounted on the rotor shaft 17 and a worm wheel mounted on the drive shaft 12. This first transmission 11 is well known in the art and is not shown in the drawing.

The unit of the electric motor 10 with the first transmission 11 can be used independently for driving a movable part of the roof assembly. For this purpose, a cable drive gear wheel (not shown) should be mounted on the drive shaft 12 and the drive cables, for example drive cables 7 (one for each side of the roof opening) run on opposite sides of the cable gear wheel and are guided there by means of guide members 18 positioned on opposite sides of the drive shaft 12 to keep the cables 7 in engagement with the cable drive gear wheel.

If this electric motor should be used for driving more than one movable part, the gear box 13 of the second transmission 14 is added onto the housing 15 of the electric motor 10 such that the electric motor 10 is able to drive either a first output shaft 19 or a second output shaft 20. As shown, each shaft 19, 20 is provided with a cable drive gear wheel 21. The gear box 13 includes mounting means, in this case screw holes 22, which can be brought in line with screw holes 23 in the housing 15 of the electric motor 10. Such screw holes 23 are generally available in a standard electric motor. Screws (not shown) will be inserted into the screw holes 22 and 23 and will fix the gear box 13 onto the housing 15 of the electric motor 10.

Figure 6:
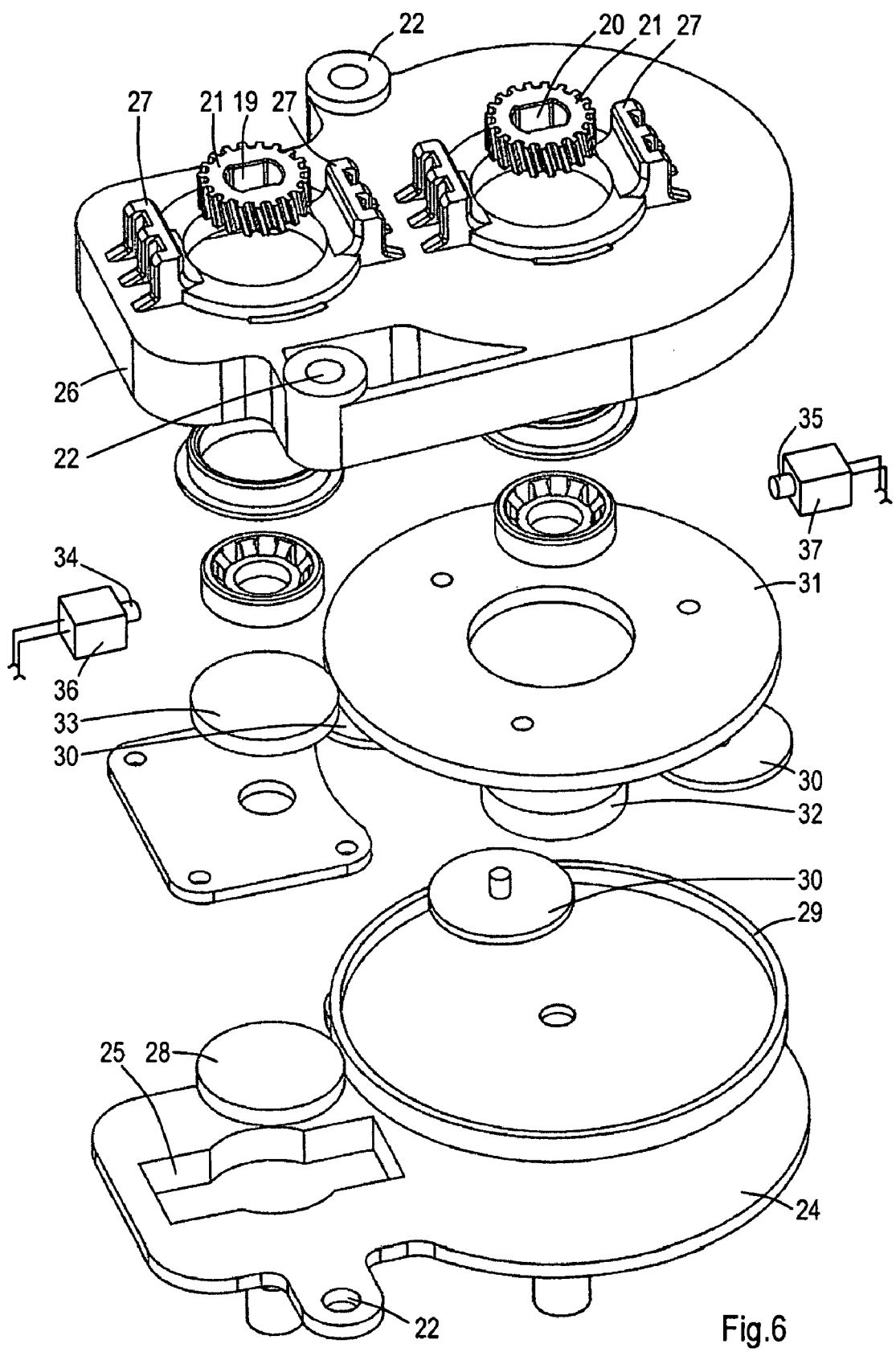
FIG. 6 is a perspective exploded view of the second transmission of FIG. 5.

As is shown in FIG. 6, a bottom wall 24 which faces and is in contact with the housing 15 of the electric motor 10, includes an opening 25 which has a shape so as to allow the drive shaft 12 and the guide members 18 to enter the opening 25. In this manner, the gear box 13 may be firmly attached to the housing 15 of the electric motor 10 and the drive shaft 12 may be engaged with the second transmission 14.

Figure 5:
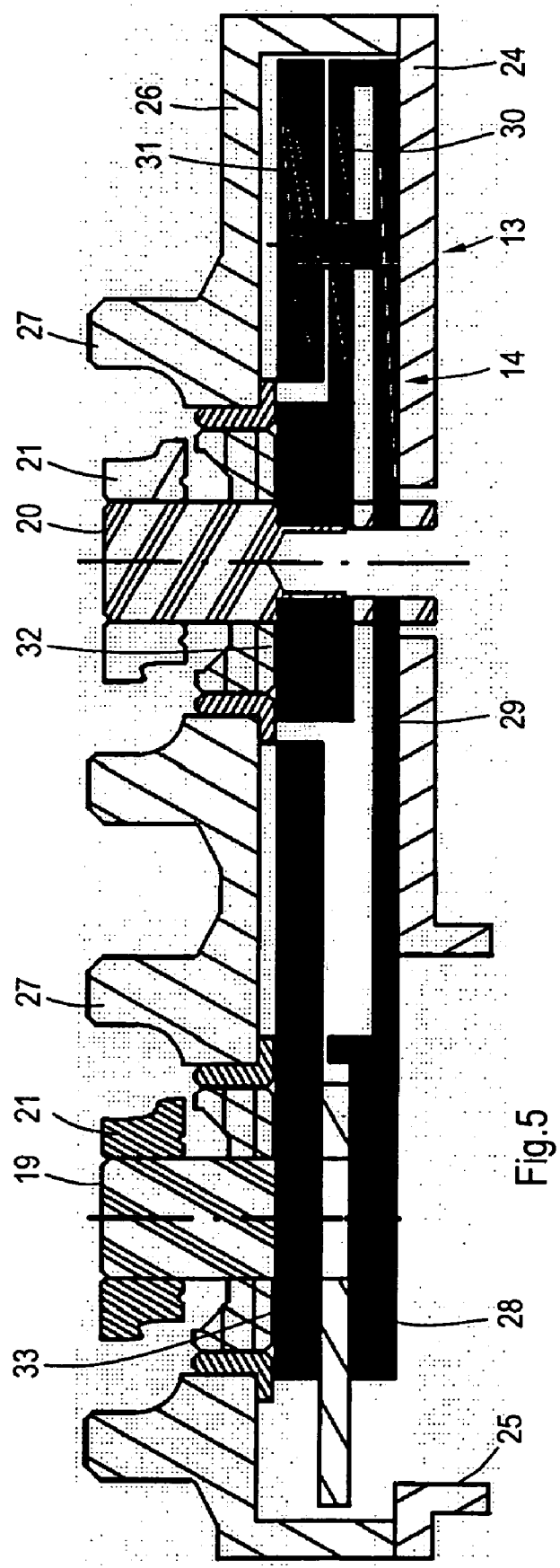
FIG. 5 is a very schematic sectional view along the lines V-V in FIG. 4 on a larger scale.

FIGS. 5 and 6 show the parts of the second transmission 14. One can recognize the bottom wall 24, an upper housing part 26 including guide members 27 for the cable drive gears 21, and the output shafts 19 and 20.

The second transmission 14 includes a planetary gear mechanism which includes a first gear wheel 28, a ring wheel 29, the outer tooting thereof being in engagement with the first gear wheel 28, and three satellite gear wheels 30, rotatably mounted onto a satellite carrier wheel 31 and in engagement with the inner tooting of the ring wheel 29 on the one hand and with a sun gear wheel 32 on the other hand. The outer tooting of the satellite carrier wheel 31 is in engagement with a second gear wheel 33 which is attached to the first output shaft 19. The second output shaft 20 is in engagement with the sun gear wheel 32.

The second gear wheel 33 is provided with a switchable lock 34 and the sun gear wheel 32 is provided with a switchable lock 35. These locks 33, 35 selectively lock one of the output shafts 19, 20 and allow the other of the output shafts 19, 20 to be driven, so that these switchable locks can be used to enable the electric motor 10 to drive one of the closure panels 3, 4.

If the switchable lock 35 of the sun gear wheel 32 is locked then, upon rotation of the first gear wheel 28 by means of the drive shafts 12 of the electric motor 10, the ring wheel 29 will rotate and the satellite gear wheels 30 will rotate with the ring wheel 29 around the fixed sun gear wheel 32. The satellite carrier wheel 31 will rotate with the rotation of the satellite gear wheel axes around the sun gear wheel 32 and will drive the second gear wheel 33 and consequently the first output shaft 19.

If the switchable lock 34 of the second gear wheel 33 is locked, then a rotation of the first gear wheel 28 will rotate the ring wheel 29, which in turn will rotate the satellite gear wheels 30 around their fixed axes (the satellite carrier wheel will be locked by the second gear wheel 33), thereby driving the sun gear wheel 32 which in turn drives the second output shaft 20.

The planetary gear wheel can have a very small building height and in assembled condition, the height of the housing 15 and the gear box 13 can be substantially equal to the height of the electric motor 10, so that the additional gear box 13 does not or hardly does not increase the building height of the drive unit.

From the forgoing it will be clear that the invention provides a drive unit which can use a standard electric motor to drive more than one movable part and which does not increase the package height of the roof assembly. The separate second transmission may be adapted to a particular purpose, while the electric motor may remain the same, thereby reducing costs.

The invention is not limited to the embodiment shown in the drawings and described above and may be varied in different manners within the scope of the appended claims. Other gear mechanisms may be used for the second transmission, if this suits the particular use, for example the one according to EP 1 588 882, but also gears mechanisms other than planetary gears. The output shafts should not extend parallel, but could also extend at an angle, for example perpendicular.

What is claimed is:

1. A drive unit for at least two movable parts of a vehicle, comprising an electric motor having a rotor shaft and transmission assembly, said transmission assembly including at least two output shafts and a switch mechanism including a locking member in order to selectively allow one output shaft of said at least two output shafts to be driven by the electric motor and to lock a second output shaft of said at least two output shafts, wherein the transmission assembly includes a first transmission included in a housing of the electric motor and acting between the rotor shaft and a drive shaft, and a second transmission which is housed in a gearbox separate from the housing of the electric motor and mounted thereto with the drive shaft in engagement with the second transmission, wherein the housing of the first transmission comprises a housing configured for driving a movable part with the first transmission, wherein the first transmission and second transmission are provided with guide members to guide a push-pull cable in engagement with a cable gear wheel on the drive shaft or output shafts respectively, and wherein the gearbox housing of the second transmission includes a wall which is directed to and in contact with the housing of the first transmission, said wall including an opening accommodating the drive shaft and cable guide members of the first transmission.

2. The drive unit according to claim 1, wherein the cable guide members of the first transmission and second transmission extend parallel when the gearbox is mounted to the electric motor.

3. The drive unit according to claim 1, wherein the second transmission is a gear mechanism.

4. The drive unit according to claim 3, wherein the gear mechanism includes a planetary gear mechanism.

5. The drive unit according to claim 4, wherein the drive shaft of the first transmission is in line with one of said at least two output shafts.

6. The drive unit according to claim 4, wherein the gearbox is a box having a height and a width, the height being smaller than the width, wherein the height of the gearbox and the height of the housing of the first transmission together are approximately equal to the height of the electric motor, and wherein the gearbox is mounted to the housing of the first transmission in a direction perpendicular to the rotor shaft of the electric motor.

7. A roof assembly for a vehicle, comprising:

a plurality of closures for selectively opening and closing at least one roof opening in the vehicle, and at least one drive unit comprising an electric motor having a rotor shaft and transmission assembly, said transmission assembly including at least two output shafts and a switch mechanism including a locking member in order to selectively allow one output shaft of said at least two output shafts to be driven by the electric motor and to lock a second output shaft of said at least two output shafts, wherein the transmission assembly includes a first transmission included in a housing of the electric motor and acting between the rotor shaft and a drive shaft, and a second transmission which is housed in a gearbox separate from the housing of the electric motor and mounted thereto with the drive shaft in engagement with the second transmission, wherein the housing of the first transmission comprises a housing configured for driving a movable part with the first transmission, wherein both the first transmission and second transmission are provided with guide members to guide a push-pull cable in engagement with a cable gear wheel on the drive shaft or output shafts respectively, and wherein the gearbox housing of the second transmission includes a wall which is directed to and in contact with the housing of the first transmission, said wall including an opening accommodating the drive shaft and cable guide members of the first transmission.

8. The roof assembly according to claim 7, wherein the cable guide members of the first transmission and second transmission extend parallel when the gearbox is mounted to the electric motor.

9. The roof assembly according to claim 7, wherein the drive shaft of the first transmission is in line with one of said at least two output shafts.

10. The roof assembly according to claim 9, wherein a height of the housing of the first transmission and the gearbox mounted thereto is approximately equal to a height of the electric motor.

11. The roof assembly of claim 10 wherein the gearbox is mounted to the housing of the first transmission in a direction perpendicular to the drive shaft of the electric motor.

12. A roof assembly, comprising:

a gearbox comprising a second transmission, wherein the gearbox is configured to attach to a housing of an electric motor; and a wall configured to be directed to and in contact with a housing of a first transmission, wherein the wall comprises an opening accommodating a drive shaft and cable guide members of the first transmission.

13. The roof assembly according to claim 12, wherein the second transmission is a gear mechanism.

14. The roof assembly according to claim 13, wherein the gear mechanism includes a planetary gear mechanism.

15. The drive unit of claim 12 wherein the gearbox is mounted to the housing of the first transmission in a direction perpendicular to the rotor shaft of the electric motor.

16. A drive unit for at least two movable parts of a vehicle, comprising:

an electric motor having a rotor shaft;

a first transmission coupled to the rotor shaft, the first transmission having an output drive shaft, the first transmission disposed in a housing, the housing having a cable guide member proximate the output drive shaft;

a second transmission housed in a gearbox and having two output shafts, wherein the gearbox is configured to be attached to the housing with a wall in contact with the housing of the first transmission, wherein the wall includes an opening configured to accommodate the output drive shaft and the cable guide member.

\* \* \* \* \*